United States Patent
Brink, Jr. et al.

(10) Patent No.: US 8,024,153 B2
(45) Date of Patent: Sep. 20, 2011

(54) METHOD FOR MANAGING WIRELESS DEVICES USING LIFECYCLE ANALYSIS

(75) Inventors: Kenneth A. Brink, Jr., Highlands Ranch, CO (US); Randy S. Johnson, Ofallon, MO (US); Raymond T. Malkowski, Round Rock, TX (US); Jeffrey H. Martin, Canton, GA (US); Tedrick N. Northway, Wood River, IL (US); Patrick J. Richards, Jr., Marietta, GA (US); Duane L. Winkler, Shawnee, KS (US)

(73) Assignee: International Business Machines Corporation, Armonk, NY (US)

( * ) Notice: Subject to any disclaimer, the term of this patent is extended or adjusted under 35 U.S.C. 154(b) by 1196 days.

(21) Appl. No.: 11/734,020

(22) Filed: Apr. 11, 2007

(65) Prior Publication Data

US 2008/0255695 A1 Oct. 16, 2008

(51) Int. Cl.
*G06Q 10/00* (2006.01)
*G06F 19/00* (2006.01)
*G06F 17/00* (2006.01)

(52) U.S. Cl. .................. 702/182; 705/7.12; 705/7.22
(58) Field of Classification Search .............. 702/1, 33, 702/34, 127, 182, 183, 184, 185, 186, 187, 702/189; 705/1.1, 7, 8, 11, 308, 7.11, 7.12, 705/7.22; 707/600, 899
See application file for complete search history.

(56) References Cited

U.S. PATENT DOCUMENTS

| | | | |
|---|---|---|---|
| 5,745,880 A * | 4/1998 | Strothmann | 705/7 |
| 6,256,515 B1 | 7/2001 | Cox et al. | |
| 6,260,020 B1 * | 7/2001 | Ruffin et al. | 705/7 |
| 6,301,612 B1 * | 10/2001 | Selitrennikoff et al. | 709/220 |
| 6,308,053 B1 | 10/2001 | Nilsson | |
| 6,308,067 B1 | 10/2001 | Morgan | |
| 6,687,496 B1 | 2/2004 | Nangle | |
| 6,820,157 B1 * | 11/2004 | Eide et al. | 710/303 |
| 6,847,970 B2 | 1/2005 | Keller et al. | |
| 6,920,319 B2 | 7/2005 | Knutsson et al. | |
| 7,010,002 B2 | 3/2006 | Chow et al. | |
| 7,302,608 B1 * | 11/2007 | Acharya et al. | 714/13 |
| 2002/0081995 A1 | 6/2002 | Leppinen et al. | |
| 2002/0154751 A1 | 10/2002 | Thompson, III et al. | |
| 2004/0063463 A1 | 4/2004 | Boivin | |
| 2005/0041648 A1 | 2/2005 | Bharatia et al. | |
| 2005/0054324 A1 | 3/2005 | Chmaytelli et al. | |
| 2006/0031399 A1 | 2/2006 | Sherman et al. | |

OTHER PUBLICATIONS

"Asset Tracking System for Networked or Networkable Assets". IBM Research Disclosure Article #456171, Apr. 2002, p. 692.

* cited by examiner

*Primary Examiner* — Edward R Cosimano
(74) *Attorney, Agent, or Firm* — Anna L. Linne; Hoffman Warnick LLC

(57) ABSTRACT

An improved solution for managing wireless devices that uses lifecycle analysis is provided. In an embodiment of the invention, the method for managing wireless devices includes obtaining data regarding at least one new wireless device; automatically evaluating a feasibility of redeploying at least one of a plurality of pre-existing wireless devices, based on the data regarding the at least one new wireless device; and identifying a distribution for the at least one of the plurality of pre-existing wireless devices, based on the automatically evaluating. In another embodiment, the distribution may include cascading and/or retiring the pre-existing wireless device(s).

22 Claims, 6 Drawing Sheets

METHOD FOR MANAGING WIRELESS DEVICES USING LIFECYCLE ANALYSIS

FIELD OF THE INVENTION

Aspects of the invention relate generally to managing wireless devices, and more particularly, to a method for managing wireless devices using lifecycle analysis.

BACKGROUND OF THE INVENTION

Usage of wireless devices such as a mobile phone, a smartphone, a personal digital assistant (PDA), etc. has exploded in recent time. Although this tremendous increase in use has effected the individual owner, there are additional complications created for a group, organization, and/or company that are using wireless devices. As the types, number, and usage of wireless devices continues to increase, it becomes critical for a company to better manage aspects of the wireless devices, such as the number and/or types of wireless devices, as well as to accurately track charges, such as monthly utilization to actual cost. Companies also find a requirement to help ensure that costs/billing be applied to a particular division, department, and/or individual level. Other important issues include keeping and tracking available information on the asset(s), such as what manufacturer, model, and/or software is installed, and how the wireless device is configured. Wireless device users also require wireless device support, either live or self-help, for problem resolution. Software updates are another requirement, keeping the wireless device up-to-date with the latest fixes and/or enhancements.

An illustrative scenario is a corporation, XYZ Corp. (XYZ), which requires mobile phones and PDA devices for employees. As such, XYZ contracts both with a cellular service provider, CP1, and with CP2, a mobile phone and PDA device provider. Both CP1 and CP2 are to each provide services for corporate and personal employee usage of their respective wireless devices. This requires XYZ and/or the employees to contact each provider (i.e., CP1, CP2) for monthly usage, billing, support, etc. Certainly with any size company, but in particular with large companies, because of the vast quantities of wireless devices and the use thereof, and/or the globalization of a company, suitable and efficient management of the wireless devices has quickly become less attainable.

A consideration in managing wireless devices is the constantly changing and improving technologies offered in the arena of wireless devices. These technologies include aspects of the services provided by the service providers for the wireless devices as well as the software and hardware entailed within the actual wireless devices. Companies obtain (e.g., purchase, rent, lease) new wireless devices on occasion. Compounding these considerations is that existing wireless devices may last beyond their useful technical life. Further, wireless devices with the company can break, get lost, can become outdated technically, and/or get passed on to other employees. Further, new employees get added to the company, while other employees retire, leave the company, and/or get promoted or transferred within the company. Older wireless devices that are being replaced or removed may still have a useful purpose be it within the company, or elsewhere. Compounding this scenario is a decision whether a particular wireless device should be assigned to a particular individual, to a particular position in a unit, to a particular budget item, and/or the like. Other decisions include whether an older wireless device should get passed on, thrown out, returned, and/or the like. Current approaches to addressing the treatment of new and pre-existing wireless devices in a company are piecemeal, at best, and, more commonly, entirely random and/or non existent.

In view of the foregoing, a need exists to overcome one or more of the deficiencies in the related art.

SUMMARY OF THE INVENTION

Aspects of the invention provide an improved solution for managing wireless devices that uses lifecycle analysis. In an embodiment of the invention, the method for managing wireless devices includes obtaining data regarding at least one new wireless device; automatically evaluating a feasibility of redeploying at least one of a plurality of pre-existing wireless devices, based on the data regarding the at least one new wireless device; and identifying a distribution for the at least one of the plurality of pre-existing wireless devices, based on the automatically evaluating. In another embodiment, the distribution may include cascading and/or retiring the pre-existing wireless device(s).

A first aspect of the invention provides a computerized method of managing a plurality of wireless devices, the method comprising: obtaining data regarding at least one new wireless device; automatically evaluating a feasibility of redeploying at least one of a plurality of pre-existing wireless devices, based on the data regarding at least one new wireless device; and identifying a distribution for the at least one of the plurality of pre-existing wireless devices, based on the automatically evaluating.

A second aspect of the invention provides a computerized system for managing a plurality of wireless devices, the system comprising: a system for obtaining data regarding at least one new wireless device; a system for automatically evaluating a feasibility of redeploying at least one of a plurality of pre-existing wireless devices, based on the data regarding at least one new wireless device; and a system for identifying a distribution for the at least one of the plurality of pre-existing wireless devices, based on the automatic evaluating.

A third aspect of the invention provides a computer program comprising program code stored on a computer-readable medium, which when executed, enables a computer system to implement a method of managing a plurality of wireless devices, the method comprising: obtaining data regarding at least one new wireless device; automatically evaluating a feasibility of redeploying at least one of a plurality of pre-existing wireless devices, based on the data regarding at least one new wireless device; and identifying a distribution for the at least one of the plurality of pre-existing wireless devices, based on the automatically evaluating.

A fourth aspect of the invention provides a method of generating a system for managing a plurality of wireless devices, the method comprising: providing a computer system operable to: obtain data regarding at least one new wireless device; automatically evaluate a feasibility of redeploying at least one of a plurality of pre-existing wireless devices, based on the data regarding at least one new wireless device; and identify a distribution for the at least one the plurality of pre-existing wireless devices, based on the automatically evaluating.

A fifth aspect of the invention provides a data processing system for managing a plurality of wireless devices, comprising: a processing unit; a bus coupled to the processing unit; and a memory medium coupled to the bus comprising program code, which when executed by the processing unit causes the data processing system to: obtain data regarding at least one new wireless device; automatically evaluate a feasibility of redeploying at least one of a plurality of pre-existing wireless devices, based on the data regarding at least one new wireless device; and identify a distribution for the at least one the plurality of pre-existing wireless devices, based on the automatically evaluating.

A sixth aspect of the invention provides computer software embodied in at least one propagated signal for managing a plurality of wireless devices, the at least one propagated signal comprising instructions for causing at least computer system to: obtain data regarding at least one new wireless device; automatically evaluate a feasibility of redeploying at least one of a plurality of pre-existing wireless devices, based on the data regarding at least one new wireless device; and identify a distribution for the at least one the plurality of pre-existing wireless devices, based on the automatically evaluating.

A seventh aspect of the invention provides a business method for managing a plurality of wireless devices, the business method comprising: managing a network that includes at least one computer system that performs the process described herein; and receiving payment based on the managing.

The illustrative aspects of the invention are designed to solve one or more of the problems herein described and/or one or more other problems not discussed.

BRIEF DESCRIPTION OF THE DRAWINGS

These and other features of the invention will be more readily understood from the following detailed description of the various aspects of the invention taken in conjunction with the accompanying drawings that depict various embodiments of the invention, in which.

It is noted that the drawings are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As indicated above, aspects of the invention provide an improved solution for managing wireless devices that uses lifecycle analysis. In an embodiment of the invention, a computerized method for managing wireless devices, wherein a customer may have a plurality of pre-existing wireless devices, includes obtaining at least one new wireless device for; automatically evaluating a feasibility of redeploying at least one of the pre-existing wireless devices; and identifying a distribution the pre-existing wireless device(s), based on the evaluating. In another embodiment, the distribution may include cascading and/or retiring the pre-existing wireless device(s). As used herein, unless otherwise noted, the term "set" means one or more (i.e., at least one); the phrase "any solution" means any now known or later developed solution; and the phrase "wireless device" means any now known or later developed device that provides for communication via any wireless technology. The phrase "wireless device" includes both an actual device and/or the hardware and/or the software used by the device using any now know or later developed technologies.

Figure 1:
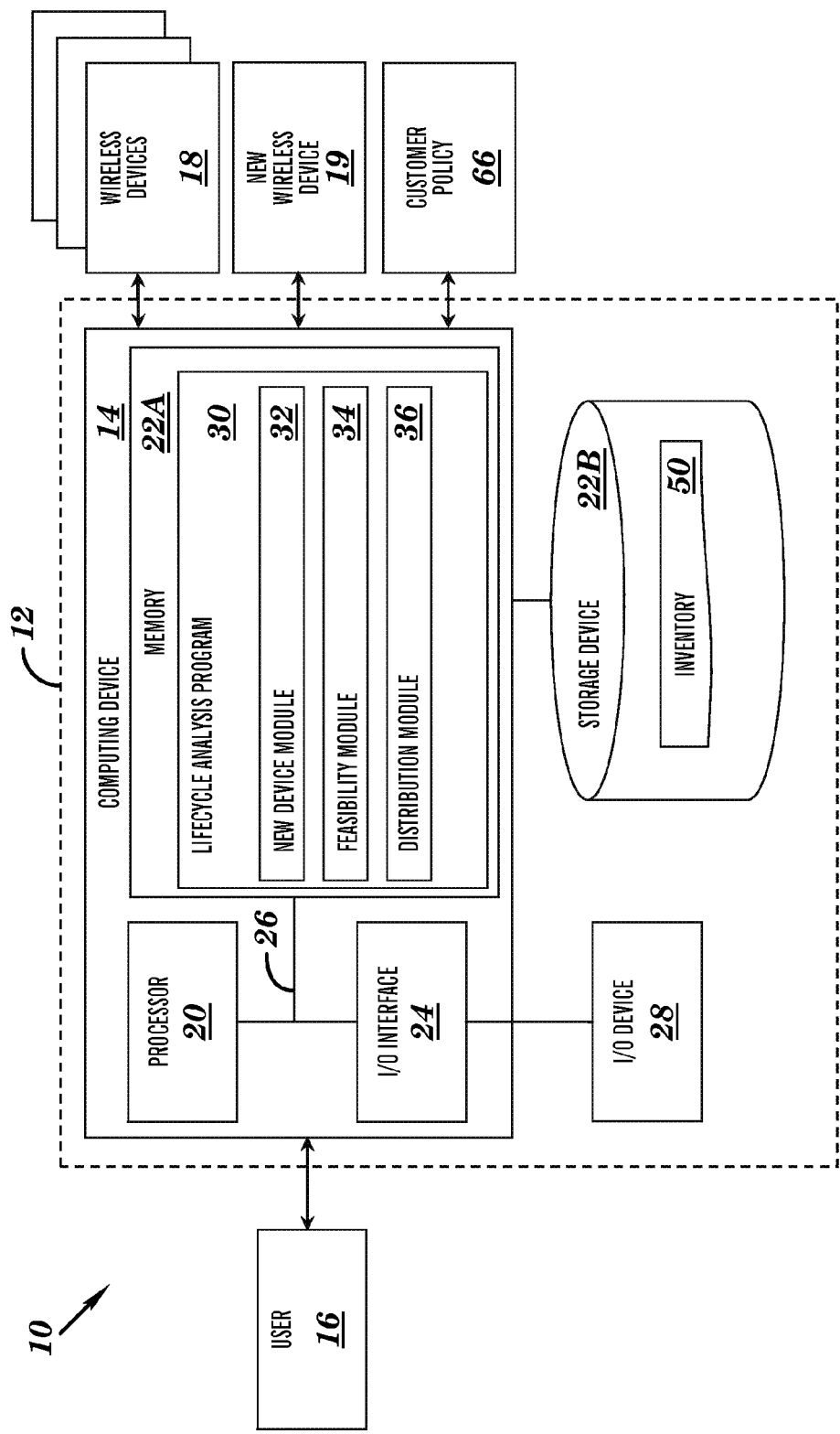
FIG. 1 shows an illustrative environment for managing wireless devices using lifecycle analysis according to an embodiment of the invention.
Figure 3:
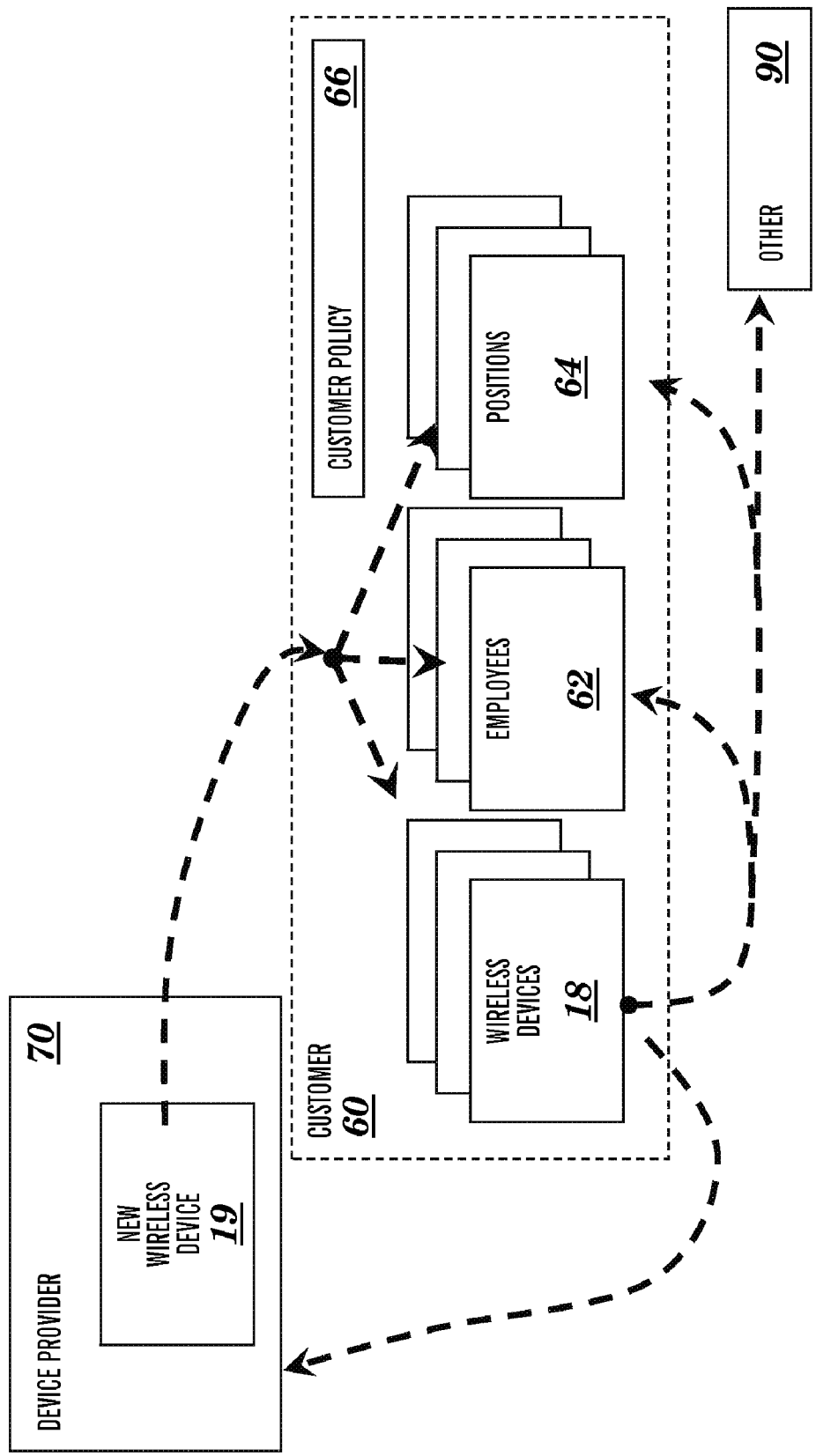
FIG. 3 shows a schematic diagram for managing wireless device using lifecycle analysis according to an mevodiment of the invention.

Turning to the drawings, FIG. 1 shows an illustrative environment 10 for managing wireless devices 18, 19 that uses lifecycle analysis according to an embodiment of the invention. To this extent, environment 10 includes a computer system 12 that can perform the process described herein in order to manage wireless devices (e.g., pre-existing wireless devices 18, new wireless device(s) 19) e.g., of a customer 60 (FIG. 3). In particular, computer system 12 is shown including a computing device 14 that comprises a lifecycle analysis program 30, which makes computing device 14 operable for managing wireless devices 18, 19 using lifecycle analysis by performing the process described herein.

Computing device 14 is shown including a processor 20, a memory 22A, an input/output (I/O) interface 24, and a bus 26. Further, computing device 14 is shown in communication with an external I/O device/resource 28 and a storage device 22B. In general, processor 20 executes program code, such as lifecycle analysis program 30, which is stored in a storage system, such as memory 22A and/or storage device 22B. While executing program code, processor 20 can read and/or write data, such as inventory 50 to/from memory 22A, storage device 22B, and/or I/O interface 24. Bus 26 provides a communications link between each of the components in computing device 14. I/O device 28 can comprise any device that transfers information between a user 16 and computing device 14. To this extent, I/O device 28 can comprise a user I/O device to enable an individual user 16 to interact with computing device 14 and/or a communications device to enable a system user, such as a wireless device 18, to communicate with computing device 14 using any type of communications link.

In any event, computing device 14 can comprise any general purpose computing article of manufacture capable of executing program code installed thereon. However, it is understood that computing device 14 and lifecycle analysis program 30 are only representative of various possible equivalent computing devices that may perform the process described herein. To this extent, in other embodiments, the functionality provided by computing device 14 and lifecycle analysis program 30 can be implemented by a computing article of manufacture that includes any combination of general and/or specific purpose hardware and/or program code. In each embodiment, the program code and hardware can be created using standard programming and engineering techniques, respectively.

Similarly, computer system 12 is only illustrative of various types of computer systems for implementing aspects of the invention. For example, in one embodiment, computer system 12 comprises two or more computing devices that communicate over any type of communications link, such as a network, a shared memory, or the like, to perform the process described herein. Further, while performing the process described herein, one or more computing devices in computer system 12 can communicate with one or more other computing devices external to computer system 12 using any type of communications link. In either case, the communications link can comprise any combination of various types of wired and/or wireless links; comprise any combination of one or more types of networks; and/or utilize any combination of various types of transmission techniques and protocols.

As discussed herein, lifecycle analysis program 30 enables computer system 12 to manage a plurality of wireless devices 18, 19 using lifecycle analysis. To this extent, lifecycle analysis program 30 is shown including a new device module 32, a feasibility module 34, and a distribution module 36. Operation of each of these modules is discussed further herein. However, it is understood that some of the various modules shown in FIG. 1 can be implemented independently, combined, and/or stored in memory of one or more separate computing devices that are included in computer system 12. Further, it is understood that some of the modules and/or functionality may not be implemented, or additional modules and/or functionality may be included as part of computer system 12.

Inventory 50 can comprise any type of electronic data. For example, inventory 50 can comprise a single data file that includes electronic data stored in any compressed or uncompressed format. However, it is understood that inventory 50 can be embodied in any number of data files and/or other storage solutions. Inventory 50 can be shared between peers and/or user 16 using any solution. For example, in a P2P network, computer system 12 can communicate/receive all of inventory 50 to/from a single peer or user 16 or can communicate/receive only a portion of inventory 50 to/from user 16 while one or more other peers and/or users 16 provide other portion(s) of inventory 50.

Figure 2:
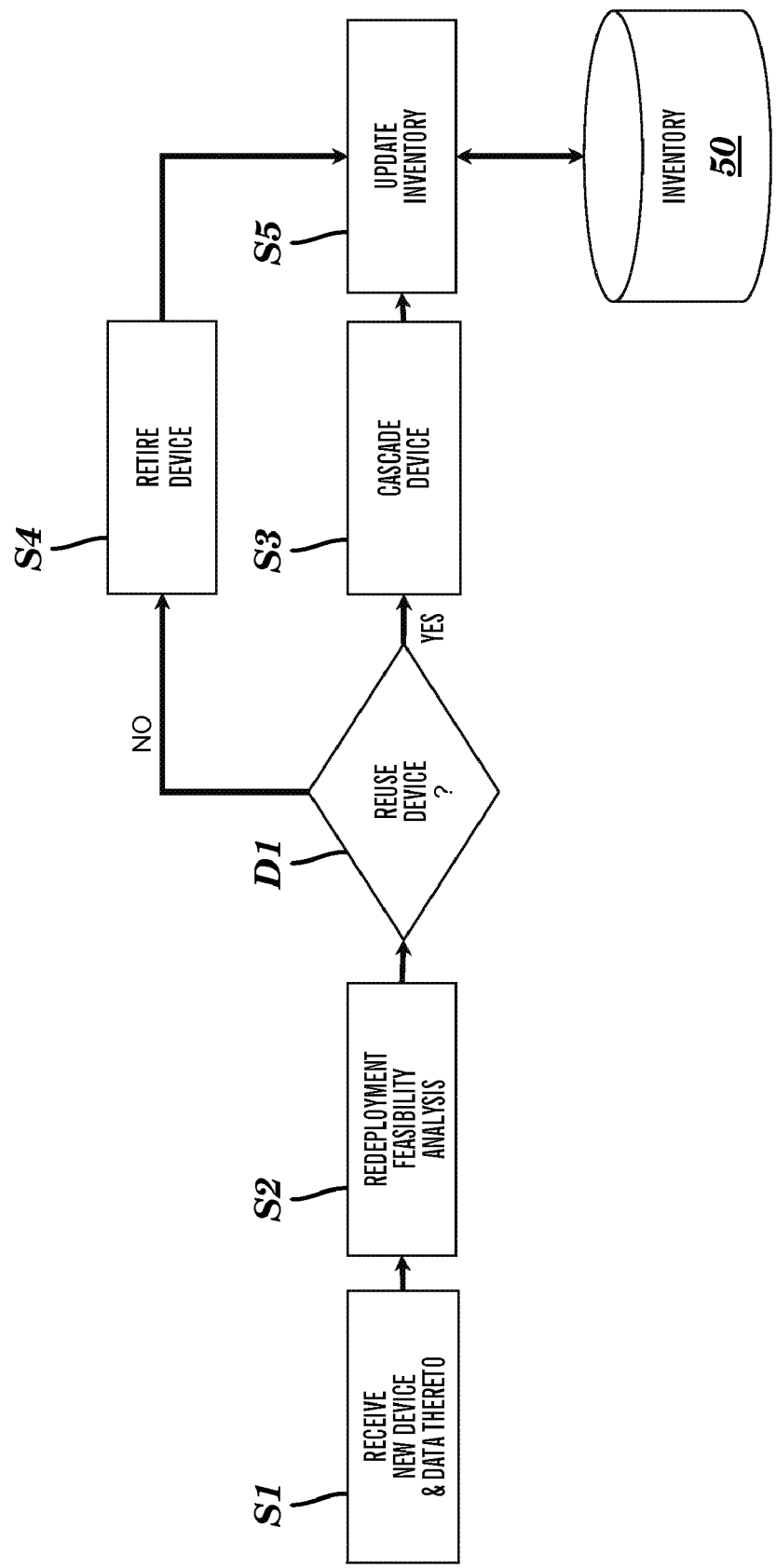
FIG. 2 shows an illustrative data flow for managing wireless devices in the environment shown in FIG. 1 according to an embodiment of the invention.

Aspects of the invention provide an improved solution for managing wireless devices 18, 19 using lifecycle analysis. To this extent, FIGS. 2 and 3 show an illustrative data flow or method for using the modules of lifecycle analysis program 30 (FIG. 1) and a schematic diagram for employing the method, respectively, according to an embodiment of the invention. For example, a customer (e.g., corporation, company, partnership, group, organization, family, entity, etc.) 60 may desire to improve the overall management, control, and/or monitoring of a plurality of pre-existing wireless devices 18 as well as at least one new wireless device 19 under its auspices. As such, under an embodiment of the invention, the method may be employed wherein S1 includes customer 60 receiving, or obtaining, data regarding at least one new wireless device 19 using new device module 32 (FIG. 1).

The data regarding the at least one new wireless device 19 may be provided by a device provider 70. Data regarding the at least one new wireless device 19 may be stored in inventory 50 for future use by, for example, lifecycle analysis program 30 (FIG. 1). Data may include, for example, specifications (e.g., type, model number, serial number, service program, service provider 70, and/or the like) related to the new wireless device 19 and/or particulars as to where the particular wireless device 19 is assigned to (e.g., particular employee, particular job position, particular unit, etc.). Regardless, the device provider 70 may be a wireless device provider, a service provider, a third party, and/or the like.

In any event, S2 includes automatically evaluating a feasibility of redeploying at least one of the plurality of pre-existing wireless devices 18, based on the data regarding the at least one new wireless device 19 (e.g., S1) and identifying a distribution for the at least one of the plurality of pre-existing wireless devices 18 based on the automatic evaluating, using feasibility module 34 (FIG. 1). A decision D1 is made as to whether the at least one of the plurality of pre-existing wireless devices 18 may be reused in some manner. Further part of S2 and/or D1 may be a determination of which, if any, particular pre-existing wireless device 18 is being replaced by the new wireless device 19. For example, the evaluation in S2/D1 may include a comparison of the pre-existing wireless device 18 with currently marketed wireless devices and determining whether suitable upgrades to the pre-existing wireless device 18 are available. Alternatively, the evaluation S2/D1 may include a determination that the pre-existing wireless device 18 is not required and/or not useful to the customer 60. If so, then the evaluation may consider and determine if the pre-existing wireless device 18 is marketable for resell back to the provider 70. Further feasibility analysis (S2/D1) may include a comparison between pre-existing wireless device 18 and specifications of provider 70 so as to determine if the pre-existing wireless device 18 may be factory refurbished and/or if refurbishment is cost effective. Additionally, the feasibility module 34 in conducting evaluation may require input from a customer policy 66, wherein the customer policy 66 includes certain requirements, parameters, rules, etc. regarding cascading and/or retiring at least one pre-existing wireless device 18.

Subsequent to the feasibility analysis and identifying a distribution, conducted by feasibility module 34 (FIG. 1), either S3 or S4 follows wherein the at least one pre-existing wireless device 18 is distributed by distribution module 36 (FIG. 1) based on the feasibility analysis S2 and decision D1. If the result of decision D1 is negative (i.e., reuse is not feasible), then the pre-existing wireless device 18 is retired in S4. "Retired" may include destroying the pre-existing wireless device 18 and/or taking the pre-existing wireless device 18 out of service, with optionally allowing it to be reused in some fashion in the future. Alternatively, if the result of decision D1 is positive (i.e., reuse is feasible), then the pre-existing wireless device 18 is cascaded in S3.

In the case where the pre-existing wireless device 18 is cascaded (i.e., S3), the pre-existing wireless device 18 is forwarded to the requisite employee 62, position 64, and/or entity. Alternatively, in the case where the pre-existing wireless device 18 is retired (i.e., S4), the device 18 may, for example, be placed in storage temporarily for possible future use (e.g., "brought out of retirement"). Still alternatively, the pre-existing wireless device 18 may be destroyed. Alternatively, the pre-existing wireless device 18 may be forwarded to another entity ("other") 90 (e.g., donated to a not-for-profit, school, etc.). Still alternatively, the pre-existing wireless device 18 may be forwarded to provider 70 for reimbursement, resell, donation, and/or the like.

Further, the method may additionally comprise S5 wherein the inventory 50 is updated. The updating can comprise storing any information obtained from the process discussed herein. For example, the results of S1, S2, D1, S3, and/or S4 may be updated in inventory 50.

Figure 4A:
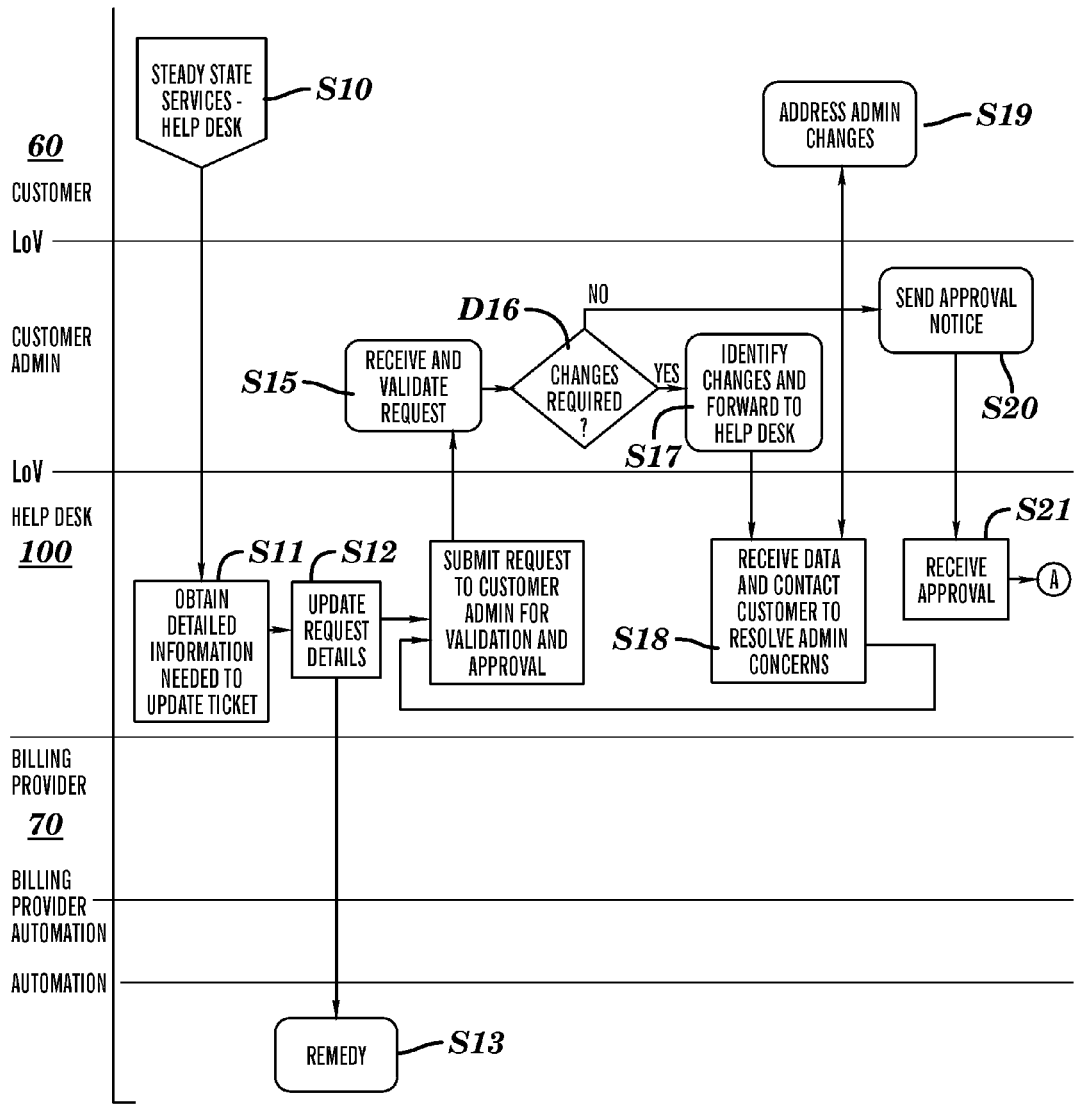
FIGS. 4A-4C show an illustrative data flow for managing wireless devices using lifecycle analysis shown in FIG. 1 according to another embodiment of the invention.
Figure 4B:
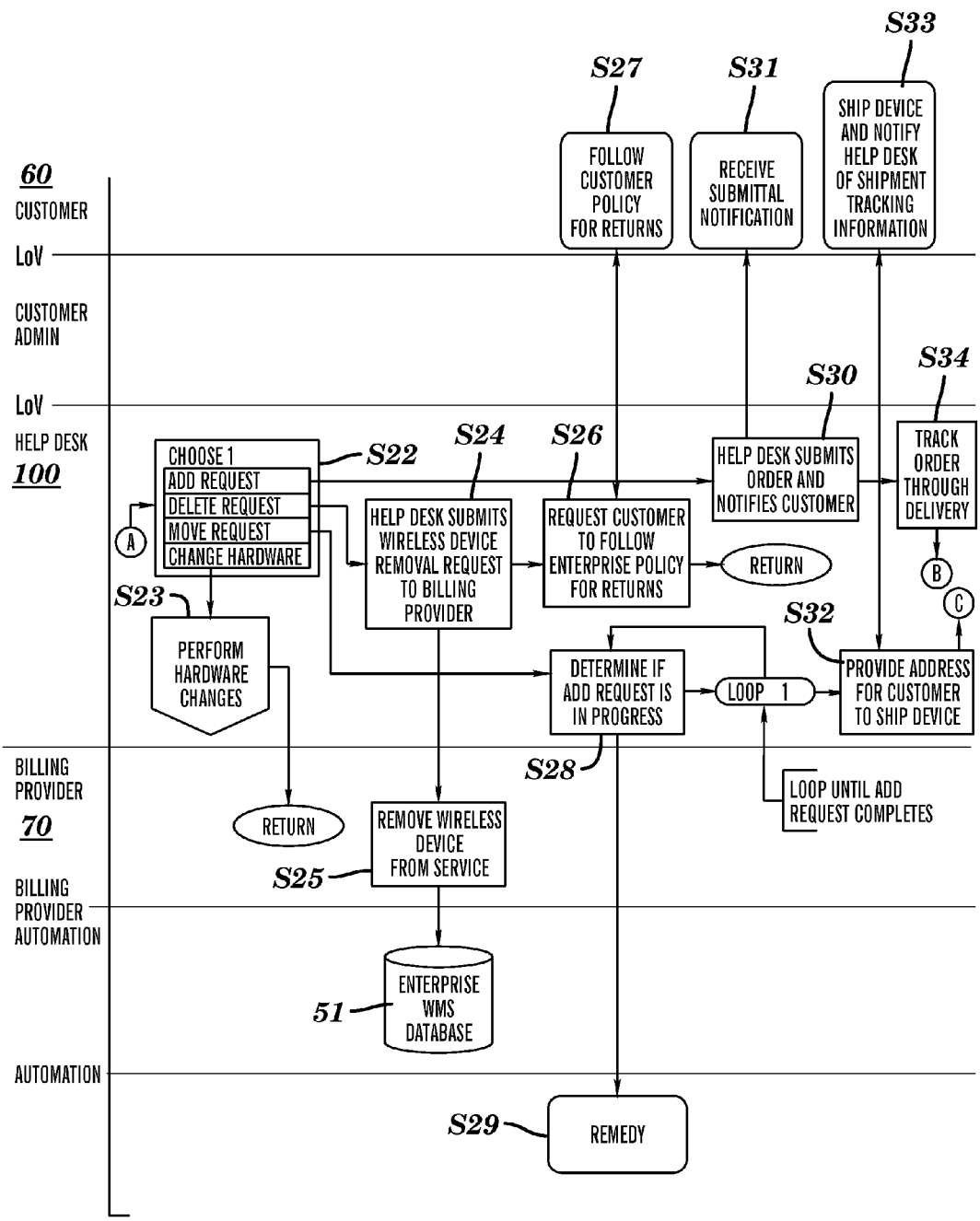
Figure 4C:
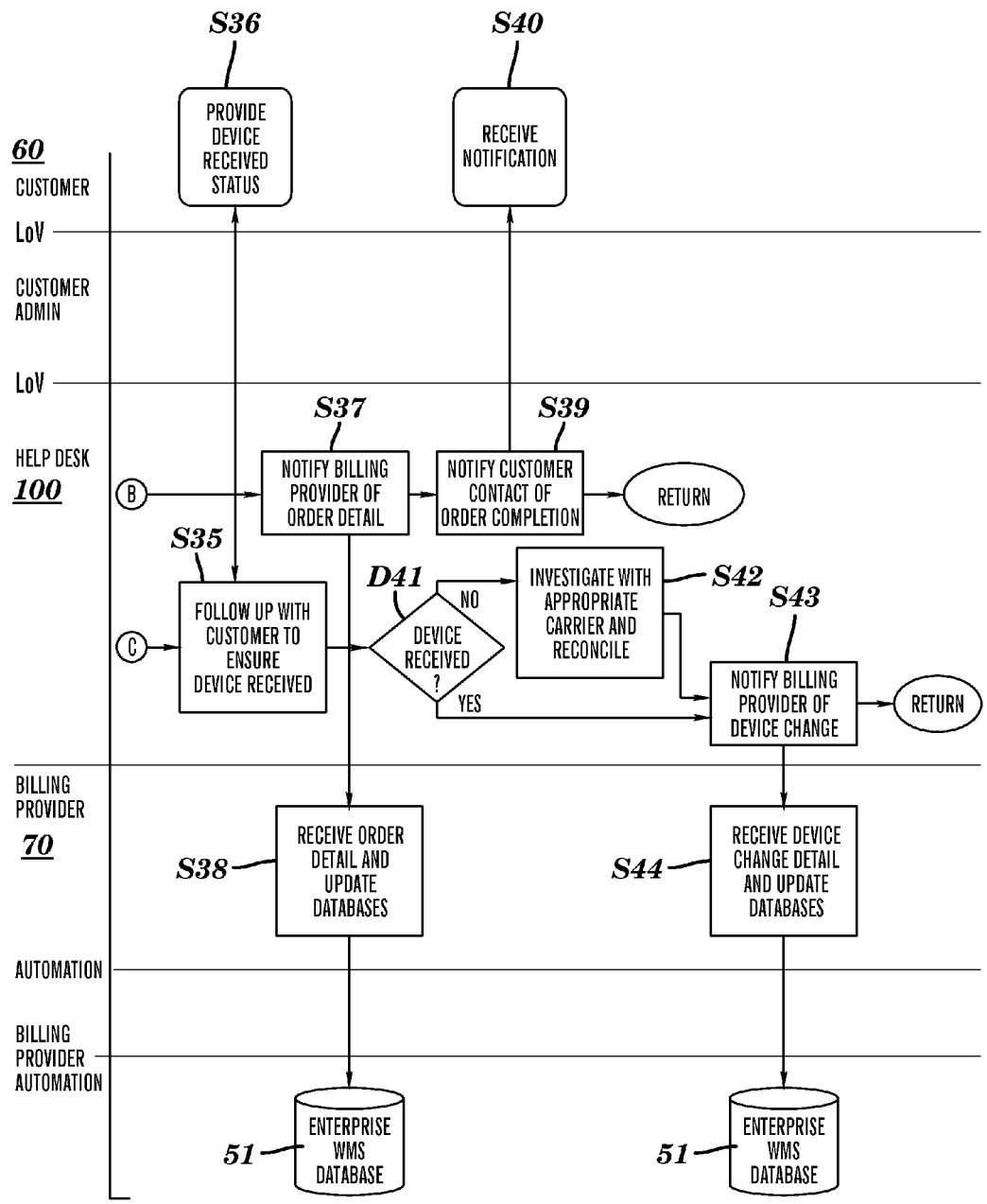

An alternative embodiment of a method for managing wireless devices 18, 19 of a customer using lifecycle analysis is shown as an illustrative data flow in FIGS. 4A-4C. The embodiment may include interaction between several parties including a customer (e.g., customer administration) 60, a service provider 100 (e.g., "Help Desk"), and a device provider 70 (e.g., "Billing Provider"). The functions provided by service provider 100 can be implemented using computer system 12 (FIG. 1), and/or the like. In any event, the method starts with S10, wherein a Steady State Services—Help Desk subprocess is provided that includes an Ordering/Move-Add-Change-Delete (MACD) Services as one of the plurality of service options provided by service provider/Help Desk 100 for customer 60 requests. S10 is invoked to address the MACD request. The MACD request typically includes a customer 60 requesting the addition of at least one new wireless device 19 (FIGS. 1-3). S11 includes the Help Desk 100 obtaining detailed information needed to update a request ticket. S12 follows wherein the Help Desk 100 updates the request ticket with data gathered from customer 60. In S13, a "Remedy" may be provided. "Remedy" may include, for example, use of a Help Desk 100 management software, a Help Desk 100 ticketing software, and/or the like. Thereby, a ticket may be opened in "Remedy", whereby the ticket includes applicable information so that Help Desk 100 and/or other entities may track and/or update status via the ticket. In any event, S14 follows, wherein the Help Desk 100 submits the request ticket to Customer Administration 60 for review, validation and approval thereby coordinating with Customer Administration 60. In S15, Customer Administration 60 receives, validates, and approves the request ticket. Decision D16 is a determination by Customer Administration 60 whether the request in the request ticket requires changes prior to submitting or if the request ticket meets customer 60 standards. If changes are required (i.e., D16 is "yes"), then S17 follows wherein Customer Administration 60 identifies the required changes and forwards data related thereto to service provider 100. S18 follows wherein the Help Desk 100 receives changes from Customer Administration 60. Changes are reviewed and the Help Desk 100 coordinates communications with the customer 60 requester in an attempt to resolve the Customer Administration 60 issues. S19 follows wherein the admin changes are addressed by the Help Desk 100 and the requester reviews the changes suggested by the Customer Administration 60 and make any necessary changes to the request. Upon completion, the flow returns to S14 for further action. Ultimately, decision D16 determines that changes are no longer required (i.e., D16 is "no") and S20 follows wherein Customer Administration 60 validates the request and sends approval of the request to the Help Desk 100 for further action. In S21 the Help Desk 100 receives the approval and begins necessary processes to fulfill the request by continuing, via "A", to FIG. 4B.

The method continues in FIG. 4B at S22 wherein the Help Desk 100 at "Choose 1" determines the request type and proceeds with the appropriate path. For example, if S22 is an add request, S30 follows; if S22 is a delete request, S24 follows; if S22 is a move request, S28 follows; and, if S22 is a change hardware, then S23 follows. S23 includes the Help Desk 100 performing hardware changes, wherein a subprocess is invoked to provide the installation and/or removal of hardware parts of pre-existing wireless device 18.

For a delete request, S24 includes the Help Desk 100 submitting to the Billing Provider 70 a removal request for the wireless device 18 (FIG. 3) to be removed from service. S25 follows S24 wherein the Billing Provider removes the particular wireless device 18 from service, and an inventory (e.g., Enterprise WMS Database 51) is updated accordingly. S26 additionally follows S24 wherein the Help Desk 100 requests the customer 60 to follow the customer policy 66 (FIG. 3) for returning wireless devices 18. S27 follows wherein the customer 60 receives the Help Desk 100 reminder to follow the customer policy 66 (FIG. 3) for returns and returns the wireless device 18 as per customer policy 66.

In the case where an add request at S22 is chosen, S30 follows wherein the Help Desk 100 takes appropriate action to submit the order and notifies the customer 60. S31 follows wherein the requestor at the customer 60 receives information that the order was submitted. Also following S30 is S34 wherein Help Desk 100 will track the status of the order through delivery. S34 assists in ensuring that customer 60 receives the order. The method continues, via connector "B", to S37 on FIG. 4C.

Turning to S37 found on FIG. 4C, S37 includes the Help Desk 100 sending the order details to the Billing Provider 70. The details may include, for example, device type and any additional information regarding new wireless device 19 that is available, such as serial number, configuration, etc. and requester information such as name, address, contact information, etc. In S38, the Billing Provider 70 receives the information (from S37) and updates the data in Enterprise WMS database 51. Further following S37, is S39 wherein Help Desk 100 completes its task by notifying the customer 60 that the order has been completed and additionally provides any information that is germane to the order. In S40 customer 60 receives notification that the new wireless device 19 order has been completed.

Returning to S22 in FIG. 4B and the scenario where a move, or cascade, request is chosen, S28 follows wherein Help Desk 100 determines, when there is an associated add request with the move request, and/or whether the add request is in progress. In this manner, the Help Desk 100 ensures that the add request is competed prior to moving forward with the move request. A "Remedy" S29 may follow S28, wherein "Remedy" includes a process as discussed herein. Additionally following S28 is Loop 1 which effectively is a delay mechanism that the Help Desk 100 ensures the associated add request is completed prior to the move request commencing. Alternatively, where no add request is associated with the particular move request, no delay via Loop 1 occurs. S32 follows wherein the Help Desk 100 contacts the customer 60 and coordinates the movement of the pre-existing wireless device 18 to the new location, including, for example, providing an address for customer 60 to ship the pre-existing wireless device 18. S33 follows wherein the customer 60, having received the instructions from the Help Desk 100 (S32), follows customer policy 66 (FIG. 3) to ship the pre-existing wireless device 18 to the location identified. The customer 60 may also provide shipment tracking information to the Help Desk 100. Also, following S32, via connector "C", is S35 (FIG. 4C).

Turning to S35 in FIG. 4C, in the case wherein a move request (e.g., request cascade pre-existing wireless device 18) had been chosen at S22 (FIG. 4B), S35 includes Help Desk 100 contacts customer 60 and obtains status on the wireless device 18 so as to ensure that the pre-existing wireless device 18 has been received. In S36, the customer 60 receives the request from Help Desk 100 and provides the status of the pre-existing wireless device 18. Also following S35 is decision D41 wherein the Help Desk 100 determines if the pre-existing wireless device 18 has been received. If the pre-existing wireless device 18 has been received (i.e., D42 is "yes"), then S43 has Help Desk 100 update Billing Provider 70 with information related to the move (e.g., cascade) of the pre-existing wireless device 18. Information may include former user name/location and new user name/location. Conversely, if the pre-existing wireless device 18 has not been received (i.e., D42 is "no"), then prior to S43, S42 occurs wherein Help Desk 100 contacts carrier to reconcile any delivery issue with shipping of pre-existing wireless device 18. Upon completion of S43, S44 follows wherein Billing Provider 70 receives the information and takes necessary steps to update Enterprise WMS Database 51.

Portions of the method that end at a "Return" task comprise the Help Desk 100 having completed all activities associated with the particular wireless device 18, 19 request. The Help Desk 100 exits the facility and the tool routes the Help Desk 100 back to Steady State Service—Help Desk subprocess S10 (FIG. 4A) where additional options may be selected. In this manner, an embodiment of the present invention provides for the Help Desk 100 to include the same functionality as computer system 12 (FIG. 1).

While shown and described herein as a method and system for managing wireless devices 18, 19 using lifecycle analysis, it is understood that the invention further provides various alternative embodiments. For example, in one embodiment, aspects of the invention may include a method, system, and/or computer program product that entails managing wireless devices, wherein at least one of the existing wireless devices 18 or new wireless device 19 are provided by a multitude of device providers 70 (FIG. 3). For example, certain economies of scale are obtained under aspects of the present invention, in particular, when a customer 60 is a large entity (e.g., international corporation, multi-division company, etc.) which has, literally, hundreds, if not thousands, of existing wireless devices 18; perhaps, thousands of employees 62; and/or thousands of positions 64 within the entity. Employees 62, positions 64, and/or wireless devices 18 are constantly shifting. Further, aspects of the invention particularly address scenarios when new wireless devices 19 and items related thereto, such as invoices, service plans, etc. are all provided by multiple device providers 70 from, perhaps, locations all over the world to the customer 60. This scenario quickly becomes exceedingly cumbersome and confusing. The invention allows for the controlled, systematic, and orderly management of the wireless devices 18, 19.

In another embodiment, the invention provides a computer program stored on a computer-readable medium, which when executed, enables a computer system to manage wireless devices 18, 19 using lifecycle analysis. To this extent, the computer-readable medium includes program code, such as lifecycle analysis program 30 (FIG. 1), which implements the process described herein. It is understood that the term "computer-readable medium" comprises one or more of any type of tangible medium of expression capable of embodying a copy of the program code (e.g., a physical embodiment). In particular, the computer-readable medium can comprise program code embodied on one or more portable storage articles of manufacture, on one or more data storage portions of a computing device, such as memory 22A (FIG. 1) and/or storage system 22B (FIG. 1), as a data signal traveling over a network (e.g., during a wired/wireless electronic distribution of the computer program), on paper (e.g., capable of being scanned and converted to electronic data), and/or the like.

In another embodiment, the invention provides a method of generating a system for managing wireless devices 18, 19 using lifecycle analysis. In this case, a computer system, such as computer system 12 (FIG. 1), can be obtained (e.g., created, maintained, having made available to, etc.) and one or more programs/systems for performing the process described herein can be obtained (e.g., created, purchased, used, modified, etc.) and deployed to the computer system. To this extent, the deployment can comprise one or more of: (1) installing program code on a computing device, such as computing device 14 (FIG. 1), from a computer-readable medium; (2) adding one or more computing devices to the computer system; and (3) incorporating and/or modifying one or more existing devices of the computer system, to enable the computer system to perform the process described herein.

In still another embodiment, the invention provides a business method that manages wireless devices 18, 19 using lifecycle analysis, which enables users to perform the process described herein on a subscription, advertising, and/or fee basis. That is, a service provider could offer to manage a network and/or a computer system 12 (FIG. 1) that allows users to managing wireless devices 18, 19 using lifecycle analysis as described herein. In this case, the service provider can manage (e.g., create, maintain, support, etc.) a virtual and/or physical network that enables users to communicate content using computer systems, such as computer system 12, that perform the process described herein. In return, the service provider can receive payment from the user(s) under a subscription and/or fee agreement, receive payment from the sale of advertising to one or more third parties, and/or the like.

As used herein, it is understood that "program code" means any set of statements or instructions, in any language, code or notation, that cause a computing device having an information processing capability to perform a particular function either directly or after any combination of the following: (a) conversion to another language, code or notation; (b) reproduction in a different material form; and/or (c) decompression. To this extent, program code can be embodied as any combination of one or more types of computer programs, such as an application/software program, component software/a library of functions, an operating system, a basic I/O system/driver for a particular computing, storage and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A computerized method, implemented on at least one computing device, of managing a plurality of portable personal wireless devices of an entity, the method comprising:
    obtaining, using the at least one computing device, data regarding at least one new wireless device in the plurality of portable personal wireless devices, wherein the new wireless device is to be deployed to a user;
    automatically evaluating, in response to the obtaining, a feasibility of redeploying at least one of a plurality of pre-existing wireless devices of the plurality of portable personal wireless devices within the entity assigned to at least one of an employee, a position, or a unit to at least one of a different employee, a different position, or a different unit within the entity, based on the data regarding at least one new wireless device, wherein the at least one of the plurality of pre-existing devices is to be replaced by the at least one new wireless device;
    identifying, in response to the evaluating, a distribution for the at least one of the plurality of pre-existing wireless devices, based on the automatic evaluating; and
    providing the identified distribution for use by a user.

2. The method of claim 1, the distribution including returning the at least one of the plurality of pre-existing wireless devices to a wireless device provider.

3. The method of claim 1, the distribution including providing a forwarding address for a location of the distribution.

4. The method of claim 1, the distribution including forwarding the at least one of the plurality pre-existing wireless devices to a storage intermediary.

5. The method of claim 1, further comprising providing an inventory database in communication with a customer.

6. The method of claim 5, further comprising updating the inventory database based on information from at least one of the obtaining, automatic evaluating, or identifying.

7. The method of claim 1, wherein the distribution comprises at least one of cascading or retiring the at least one of the plurality of pre-existing wireless devices.

8. The method of claim 7, the cascading including assigning the at least one of the plurality of pre-existing wireless devices to at least one of an employee, a position, or a unit within the entity.

9. The method of claim 7, the cascading including at least one of: clearing contents of the at least one of the plurality of pre-existing wireless devices or refurbishing the at least one of the plurality of pre-existing wireless devices.

10. The method of claim 7, the retiring including one of donating the at least one of the plurality of pre-existing wireless devices to an entity or destroying the at least one of the plurality of pre-existing wireless devices.

11. A computerized system for managing a plurality of portable personal wireless devices of an entity, the system comprising:
at least one computing device including:
a system for obtaining data regarding at least one new wireless device in the plurality of portable personal wireless devices, wherein the new wireless device is to be deployed to a user;
a system for automatically evaluating, in response to the obtaining, a feasibility of redeploying at least one of a plurality of pre-existing wireless devices of the plurality of portable personal wireless devices within the entity assigned to at least one of an employee, a position, or a unit to at least one of a different employee, a different position, or a different unit within the entity, based on the data regarding at least one new wireless device, wherein the at least one of the plurality of pre-existing devices is to be replaced by the at least one new wireless device;
a system for identifying, in response to the evaluating, a distribution for the at least one of the plurality of pre-existing wireless devices, based on the automatic evaluating; and
a system for providing the identified distribution for use by a user.

12. The system of claim 11, further comprising: an inventory database in communication with a customer; and a system for updating the inventory database based on information from at least one of the system for obtaining, system for automatic evaluating, or system for identifying.

13. The system of claim 11, the distribution including a system for returning the at least one of the plurality of pre-existing wireless devices to a wireless device provider.

14. The system of claim 11, the distribution including a system for providing a forwarding address for a location of the distribution.

15. The system of claim 11, the distribution including a system for forwarding the at least one of the plurality of pre-existing wireless devices to a storage intermediary.

16. The system of claim 11, wherein the distribution comprises at least one of a cascading system or a retiring system for the at least one of the plurality of pre-existing wireless devices.

17. The system of claim 16, the cascading system including a system for assigning the at least one of the plurality of pre-existing wireless devices to at least one of an employee, a position, or a unit within the entity.

18. The system of claim 16, the cascading system including at least one of: a system for clearing contents of the at least one of the plurality of pre-existing wireless devices or a system for refurbishing the at least one of the plurality of pre-existing wireless devices.

19. The system of claim 16, the retiring system including a system for donating the at least one of the plurality of pre-existing wireless devices to an entity.

20. A non-transitory computer-readable medium storing a computer program comprising program code, which when executed, causes a computer system to implement a method of managing a plurality of portable personal wireless devices of an entity, the method comprising:
obtaining data regarding at least one new wireless device in the plurality of portable personal wireless devices, wherein the new wireless device is to be deployed to a user;
automatically evaluating, in response to the obtaining, a feasibility of redeploying at least one of a plurality of pre-existing wireless devices of the plurality of portable personal wireless devices within the entity assigned to at least one of an employee, a position, or a unit to at least one of a different employee, a different position, or a different unit within the entity, based on the data regarding at least one new wireless device, wherein the at least one of the plurality of pre-existing devices is to be replaced by the at least one new wireless device;
identifying, in response to the evaluating, a distribution for the at least one of the plurality of pre-existing wireless devices, based on the automatic evaluating; and
providing the identified distribution for use by a user.

21. A method of generating a system for managing a plurality of portable personal wireless devices of an entity, the method comprising:
providing a computer system including at least one computing device, wherein the computer system performs the following:
obtain data regarding at least one new wireless device in the plurality of portable personal wireless devices, wherein the new wireless device is to be deployed to a user;
automatically evaluate, in response to the obtaining, a feasibility of redeploying at least one of a plurality of pre-existing wireless devices of the plurality of portable personal wireless devices within the entity assigned to at least one of an employee, a position, or a unit to at least one of a different employee, a different position, or a different unit within the entity, based on the data regarding at least one new wireless device, wherein the at least one of the plurality of pre-existing devices is to be replaced by the at least one new wireless device;
identify, in response to the evaluating, a distribution for the at least one of the plurality of pre-existing wireless devices, based on the automatic evaluating; and
provide the identified distribution for use by a user.

22. The method of claim 21, wherein the distribution comprises at least one of cascading or retiring the at least one of the plurality of pre-existing wireless devices.

* * * * *